United States Patent
Siswick et al.

(10) Patent No.: US 11,993,227 B2
(45) Date of Patent: May 28, 2024

(54) CONTROL METHOD AND APPARATUS FOR CONTROLLING OPERATION OF AN ACCESS CONTROL DEVICE FOR A VEHICLE

(71) Applicant: JAGUAR LAND ROVER LIMITED, Coventry (GB)

(72) Inventors: Howard Siswick, Coventry (GB); Mohammed Khan, Coventry (GB); John Davies, Coventry (GB)

(73) Assignee: Jaguar Land Rover Limited, Whitley (GB)

( * ) Notice: Subject to any disclaimer, the term of this patent is extended or adjusted under 35 U.S.C. 154(b) by 891 days.

(21) Appl. No.: 17/044,613

(22) PCT Filed: Feb. 8, 2019

(86) PCT No.: PCT/EP2019/053166
§ 371 (c)(1),
(2) Date: Oct. 1, 2020

(87) PCT Pub. No.: WO2019/192765
PCT Pub. Date: Oct. 10, 2019

(65) Prior Publication Data
US 2021/0197764 A1  Jul. 1, 2021

(30) Foreign Application Priority Data
Apr. 4, 2018 (GB) ...................................... 1805512

(51) Int. Cl.
*B60R 25/24* (2013.01)
(52) U.S. Cl.
CPC ..................... *B60R 25/24* (2013.01)
(58) Field of Classification Search
CPC ...................................................... B60R 25/24
See application file for complete search history.

(56) References Cited

U.S. PATENT DOCUMENTS

| | | | | |
|---|---|---|---|---|
| 8,930,045 B2* | 1/2015 | Oman | ............... | G07C 9/00309 |
| | | | | 340/426.36 |
| 8,949,022 B1* | 2/2015 | Fahrner | .................. | G01C 21/20 |
| | | | | 340/995.19 |

(Continued)

FOREIGN PATENT DOCUMENTS

| | | |
|---|---|---|
| CN | 103582093 A | 2/2014 |
| CN | 103700170 A | 4/2014 |

(Continued)

OTHER PUBLICATIONS

Chinese Office Action, with English translation, corresponding to Chinese Application No. 201980024929.9, dated May 24, 2023, 31 pages.

(Continued)

*Primary Examiner* — Ramsey Refai
(74) *Attorney, Agent, or Firm* — Reising Ethington P.C.

(57) ABSTRACT

The present disclosure relates to a controller (20) for controlling operation of an access control device (2) for a vehicle (3). The access control device (2) is selectively operable in a first operating mode (P1) and a second operating mode (P2). The access control device (2) is in a limited response mode when operating in the first operating mode (P1). The controller (20) includes a processor (24) and a memory means (23). The processor (24) is configured to determine a position of the access control device (2) and to generate a control signal for activating the first operating mode (P1). The control signal is generated in dependence on the determined position of the access control device (2). The controller (20) may be provided in the access control device (2). The present disclosure also relates to a method of controlling operation of an access control device (2).

20 Claims, 4 Drawing Sheets

(56) References Cited

U.S. PATENT DOCUMENTS

| | | | |
|---|---|---|---|
| 9,230,440 B1* | 1/2016 | Penilla | B60L 53/66 |
| 10,315,623 B2* | 6/2019 | Iwashita | G07C 9/00309 |
| 2005/0285716 A1 | 12/2005 | Denison et al. | |
| 2009/0212906 A1* | 8/2009 | Michel | B60R 25/24 |
| | | | 340/5.72 |
| 2012/0268242 A1* | 10/2012 | Tieman | B60R 25/24 |
| | | | 340/5.61 |
| 2014/0045537 A1 | 2/2014 | Luther et al. | |
| 2014/0285319 A1 | 9/2014 | Khan et al. | |
| 2014/0292481 A1 | 10/2014 | Dumas et al. | |
| 2014/0316609 A1 | 10/2014 | Washington et al. | |
| 2014/0368313 A1* | 12/2014 | Seiberts | G07C 9/00309 |
| | | | 340/5.61 |
| 2015/0028995 A1 | 1/2015 | Gautama et al. | |
| 2015/0048927 A1 | 2/2015 | Simmons | |
| 2015/0070135 A1 | 3/2015 | Ford | |
| 2015/0149042 A1 | 5/2015 | Cooper et al. | |
| 2015/0288800 A1 | 10/2015 | Pianese et al. | |
| 2016/0042579 A1* | 2/2016 | Austen | B60R 25/245 |
| | | | 340/5.61 |
| 2016/0112846 A1* | 4/2016 | Siswick | H04W 52/0235 |
| | | | 455/456.4 |
| 2016/0176382 A1 | 6/2016 | Siswick et al. | |
| 2017/0019480 A1 | 1/2017 | Yokota et al. | |
| 2017/0353838 A1 | 12/2017 | Siswick et al. | |

FOREIGN PATENT DOCUMENTS

| | | | |
|---|---|---|---|
| CN | 103959346 A | | 7/2014 |
| CN | 104108356 A | | 10/2014 |
| CN | 104349281 A | | 2/2015 |
| CN | 104769973 A | | 7/2015 |
| CN | 105247577 A | | 1/2016 |
| CN | 105263763 A | | 1/2016 |
| CN | 105554304 A | | 5/2016 |
| CN | 106131337 A | | 11/2016 |
| CN | 106502371 A | | 3/2017 |
| CN | 106569585 A | | 4/2017 |
| CN | 107544822 A | | 1/2018 |
| JP | 2007049362 A | | 2/2007 |
| WO | WO2015181221 A1 | | 12/2015 |

OTHER PUBLICATIONS

International Search Report corresponding to International Application No. PCT/EP2019/053166, dated Jul. 4, 2019, 5 pages.
Written Opinion corresponding to International Application No. PCT/EP2019/053166, dated Jul. 4, 2019, 9 pages.
Combined Search and Examination Report corresponding to GB Application No. GB 1805512.9, dated Oct. 4, 2018, 9 pages.
Examination Report corresponding to GB Application No. GB 1805512.9, dated Jul. 31, 2020, 4 pages.
European Office Action corresponding to European Application No. 19719765.0, dated Nov. 22, 2022, 6 pages.
Chinese Office Action, with English translation, corresponding to Chinese Application No. 201980024929.9, dated Nov. 3, 2021, 30 pages.

* cited by examiner

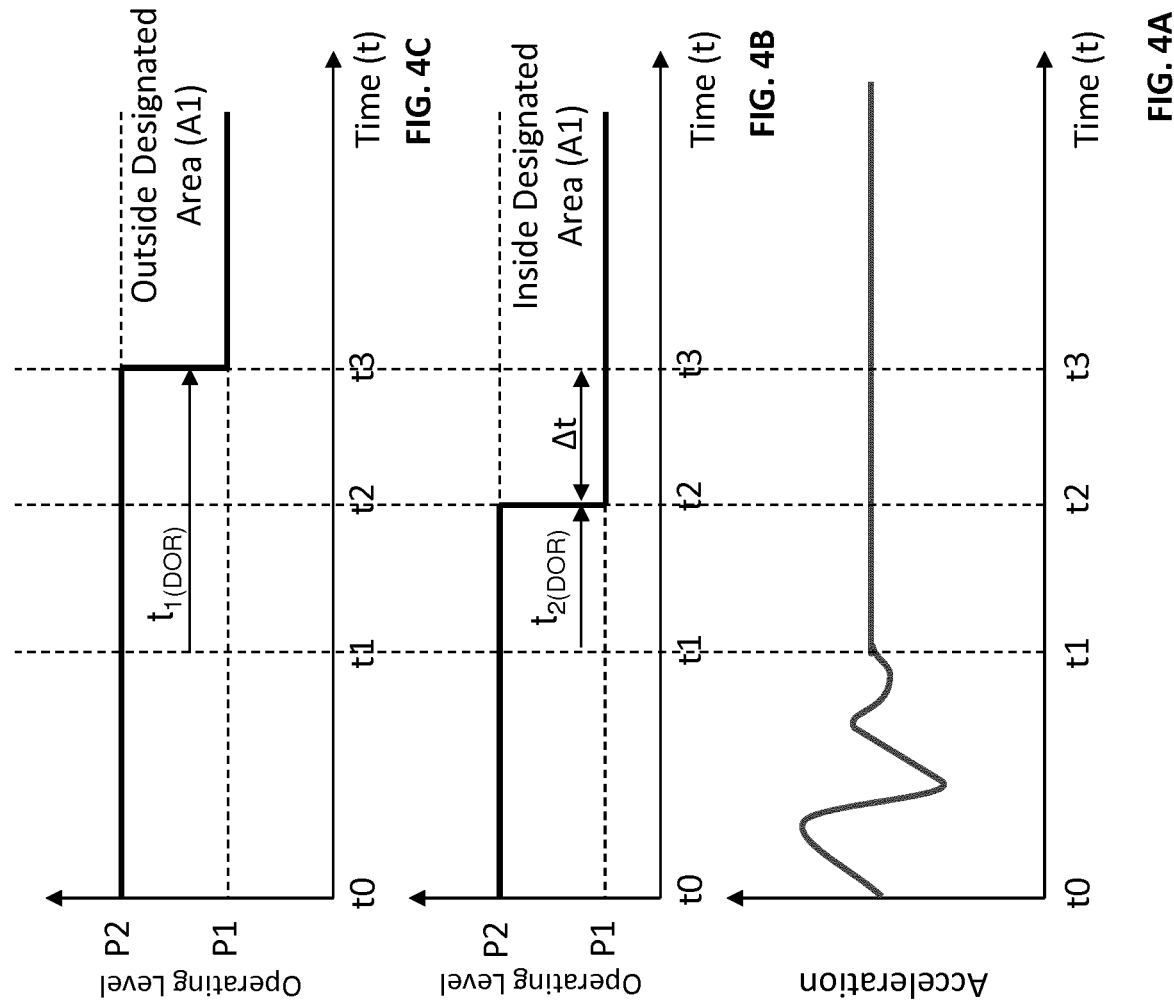
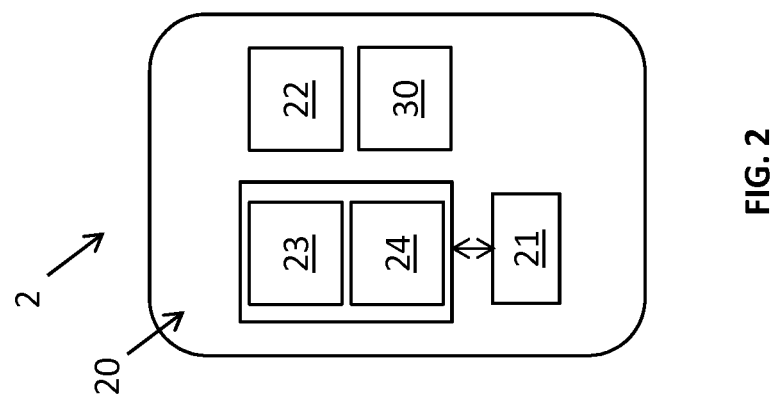

CONTROL METHOD AND APPARATUS FOR CONTROLLING OPERATION OF AN ACCESS CONTROL DEVICE FOR A VEHICLE

TECHNICAL FIELD

The present disclosure relates to a control method and apparatus. More particularly, but not exclusively, the present disclosure relates to a control method and apparatus for controlling operation of an access control device.

BACKGROUND

It is known to provide vehicles with systems for facilitating remotely controlled vehicle functions such as passive entry and passive starting (i.e., PEPS) of a host vehicle. When a vehicle is equipped with a PEPS system, a user carries a mobile vehicle access device which can communicate with a base station located in the vehicle. To conserve use of energy stored in its internal battery, the vehicle access device may operate in different operating modes. For example, the vehicle access device may operate in a sleep mode to conserve power. The vehicle access device may, for example, comprise a sensor for monitoring movement. After a period of time in which the mobile communication unit has remained stationary and has not been otherwise activated, the vehicle access device would be caused to enter the sleep mode.

Keyless entry systems may track the relative position of a 'paired' access control device (for example, a paired key fob) relative to the host vehicle. As a consequence of the extensive wireless communication required to achieve accurate positional resolution, there is a need to keep energy consumption in the access control device to a minimum in order to maximise fob battery life.

The present invention attempts to provide improved control of a vehicle access device.

SUMMARY OF THE INVENTION

Aspects of the present invention relate to a controller, an access control device, a vehicle access system, a vehicle, a method and a non-transitory computer-readable medium as claimed in the appended claims.

According to a further aspect of the present invention there is provided a controller for controlling operation of an access control device for a vehicle, the access control device being selectively operable in a first operating mode and a second operating mode, the access control device being in a limited response mode when operating in the first operating mode than in the second operating mode, the controller comprising a processor and a memory means, the processor being configured to:

determine a position of the access control device; and
generate a control signal for activating the first operating mode, the control signal being generated in dependence on the determined position of the access control device. The access control device is a portable device operable to control access to the vehicle. The limited response mode is a mode in which the access control device consumes less power. The limited response mode may be a "sleep" mode (i.e. completely inactive for a period of time); a limited response duty cycle mode (inactive for a long period of time), or periodically active for a short period of time. The access control device consumes less power when operating in the first operating mode than in the second operating mode. By activating the first operating mode, power consumption by the access control device may be reduced. The activation of the first operating mode is controlled in dependence on the determined position of the access device. By way of example, the first operating mode may be activated when the controller is located in an area where expected usage is low, for example an overnight storage position.

The position of the access control device may be determined relative to the vehicle or as an absolute geospatial position. The positional accuracy may be within a range of several metres or less. If the user habitually leaves the portable device in approximately the same position when they park the vehicle, for example at their place of residence or place of work, the controller can be configured to learn this behaviour and control operation of the access control device accordingly. For example, the controller can switch the access control device to the first operating mode when it comes to rest after a very short settling period. Alternatively, the vehicle could send a control signal to the access control device to activate the first operating mode upon identifying that the learnt conditions have been satisfied.

The controller may be provided in the access control device. Alternatively, the controller may be remote from the access control device. The controller may be provided in the vehicle, for example in a base station.

The access control device may be actuated to control one or more vehicle systems, for example to unlock vehicle doors and/or to operate the vehicle ignition or other vehicle activation system. The actuation of the access control device may be passive or active. The actuation of the access control device may, for example, comprise communicating with a base station provided in the vehicle. The actuation may be performed automatically, for example when the access control device is within a predetermined range of the vehicle. Alternatively, the actuation may be performed in response to a user input, for example depressing a button.

The processor may be configured to identify when the access control device is positioned within a designated area. The processor may generate the control signal for activating the first operating mode in dependence on identification that the access control device is positioned within the designated area. The processor may be configured to identify when the access control device is positioned outside the designated area. The processor may be configured to generate the control signal immediately upon determining that the access control device is positioned within the designated area. Alternatively, the processor may be configured to delay generation of the control signal after determining that the access control device is positioned within the designated area.

The processor may be configured to identify the designated area by: recording a first time when the access control device is substantially stationary and optionally not in communication with the vehicle; and recording a second time when the access control device is actuated. The processor may determine a time period elapsed between said first and second times. When the time period is greater than a predefined time period, the processor may identify the designated area as the position of the access control device between said first and second times.

The memory means may store a set of computational instructions which are executed by the processor. Alternatively, or in addition, the memory means may store a position of the designated area. The position may be stored as a geospatial position. The position of the designated area may be updated over time. The memory means may comprise a memory device. The memory means may comprise a distributed memory, for example distributed between the vehicle and the access control device. The memory means may store a plurality of said designated areas. For example, a first designated area may correspond to a home position (for example, inside a user's place of residence); and a second designated area may correspond to a work position (for example, inside a user's place or work). The processor may be configured to selectively activate said first designated area or said second designated area in dependence on a positional signal, for example output from a positioning system provided on the vehicle.

The access control device may be configured to communicate with a base station to download one or more stored position or address to the memory means. The base station may be provided in the vehicle. The base station may, for example, communicate with a positioning system provided in the vehicle. The processor may be configured to use the stored position or address to identify a designated area where the access control device is likely to be dormant for an extended period of time. Upon determining that the vehicle has arrived at the stored position or address, the processor may be configured to generate the control signal to activate the first operating mode.

The processor may be configured to monitor movement of the access control device. The processor may be configured to monitor movement in dependence on a movement signal from a movement sensor. The movement sensor may be provided in the access control device. The movement sensor may, for example, comprise an accelerometer and/or a gyroscope. In use, the movement sensor may also monitor movements of the access control device to enable identification of a predetermined motion gesture.

Alternatively, the processor may be configured to monitor movement of the access control device by communicating with a base station, for example using signal triangulation. The processor may be configured to identify when the access control device is at least substantially stationary.

The processor may be configured to identify the designated area by identifying one or more position where the position of the access control device remains substantially unchanged for at least a minimum time period on a predetermined number of occasions. The number of occasions may be greater than one. The processor may be configured to identify the same position on a plurality of occasions, for example more than ten (10), twenty (20) or thirty (30) occasions.

The processor may be configured to identify one or more position of the access control device when the access control device is actuated. The processor may be configured to determine an actuation rate of the access control device at a given position. The actuation rate may represent the number of times that the access control device is actuated within a predetermined time period. The processor may identify the designated area by identifying one or more position where the actuation rate of the access control device is less than a predefined actuation threshold.

The processor may be configured to identify the access control device as being dormant when the access control device is substantially stationary (i.e. the access control device is immobile). The access control device may optionally comprise a movement sensor for detecting movement of the access control device. The processor may receive a signal from the movement sensor to determine when the access control device is substantially stationary. The processor may determine that the access control device is substantially stationary when the position of the access control device does not change. Alternatively, or in addition, the processor may be configured to identify the access control device as being dormant when it is not being actuated and/or is not in communication with the vehicle.

The processor may be configured to generate the control signal in dependence on determination that the access control device has been dormant for a predetermined period of time (referred to herein as a "dormant time"). The dormant time may be a fixed period of time or a variable period of time. When the access control device is positioned inside the designated area, the predetermined period of time may be a first dormant time. When the access control device is positioned outside the designated area, the predetermined period of time may be a second dormant time. The second dormant time may be longer than the first dormant time.

The processor may be configured to vary the dormant time before generating the control signal in dependence on the actuation rate of the access control device in a particular position. The processor may be configured to extend the dormant time in a position where the actuation rate is greater than a predefined actuation threshold. The processor may be configured to reduce the dormant time in a position where the actuation rate is lower than a predefined actuation threshold. The dormant time could be directly proportional to the actuation rate of the access control device. The higher the actuation rate of the access control device for a given position, the longer the dormant time. This arrangement would provide a dynamic dormant time based on position and historic actuation of the access control device for a particular position.

The processor may be configured to identify the designated area by identifying a position where the access control device switches from the second operating mode to the first operating mode on a predetermined number of occasions. The predetermined number of occasions may be greater than one.

The processor may be configured to determine the position of the access control device in relation to a vehicle; and the designated area is defined in relation to the vehicle. The processor may determine a range and/or a heading of the access control device relative to the vehicle. The processor may determine a range and/or a heading of the designated area relative to the vehicle.

The processor may be configured to determine a geospatial position of the access control device. The position of the designated area may be defined as a geospatial position.

The access control device may comprise one transceiver for communicating with the vehicle or a base station. For example, the access control device may comprise a Bluetooth® transceiver or an ultra-wide band (UWB) transceiver. Alternatively, the access control device may comprise first and second transceivers. The first transceiver may be suitable for long-range communications and/or approach awareness; and the second transceiver may be suitable for short-range communications. In use, the first and second transceivers may consume different amounts of power. The first transceiver may consume less power than the second transceiver. The first transceiver may comprise a Bluetooth® transceiver; and the second transceiver may comprise an ultra-wide band (UWB) transceiver. The UWB transceiver may be activated for location determination after determining that the access control device is within a predetermined range of the vehicle, for example within a range of 6 m. The control signal may be transmitted to the access control device via one of the first and second transceivers and the limited response mode may comprise disabling the other of said first and second transceivers. In dependence on receipt of the control signal, the processor may be configured to disable one of said first and second transceivers with immediate effect. The access control device would thereby enter the limited response mode.

According to a further aspect of the present invention there is provided an access control device comprising a controller as described herein. The access control device may comprise or consist of a key fob. According to a further aspect of the present invention there is provided a base station comprising a controller as described herein. The base station may be provided in the vehicle.

According to a further aspect of the present invention there is provided an access control system comprising an access control device of the type described herein.

According to a further aspect of the present invention there is provided a vehicle comprising a controller, an access control system or an access control device as described herein.

According to a further aspect of the present invention there is provided a method of controlling operation of an access control device which is selectively operable in a first operating mode and a second operating mode, the access control device being in a limited response mode when operating in the first operating mode, the method comprising:

determining a position of the access control device; and
generating a control signal for activating the first operating mode, the control signal being generated in dependence on the determined position of the access control device. The access control device consumes less power when operating in the first operating mode than in the second operating mode.

The method may comprise identifying when the access control device is positioned within a designated area; and activating the first operating mode upon identification that the access control device is positioned within the designated area.

The method may comprise identifying the designated area by: recording a first time when the access control device is substantially stationary and optionally not in communication with the vehicle; and recording a second time when the access control device is actuated. The method may comprise determining a time period elapsed between said first and second times. The designated area may be identified as the position of the access control device between said first and second times when the time period is greater than a predefined time period.

The method may comprise identifying one or more position of the access control device when the access control device is actuated. The method may comprise determining an actuation rate of the access control device at a given position.

The method may comprise identifying the designated area by identifying an area where the actuation rate of the access control device is less than a predefined actuation threshold.

The method may comprise activating the first operating mode in dependence on determination that the access control device has been dormant for a predetermined period of time.

When the access control device is positioned inside the designated area, the predetermined period of time may be a first dormant time. When the access control device is positioned outside the designated area, the predetermined period of time may be a second dormant time. The second dormant time may be longer than the first dormant time.

The method may comprise identifying the designated area by identifying a position where the access control device switches from the second operating mode to the first operating mode on a predetermined number of occasions. The predetermined number of occasions may be greater than one.

The method may comprise determining the position of the access control device in relation to a vehicle; and defining the designated area in relation to the vehicle.

The method may comprise determining a geospatial position of the access control device; and defining the designated area as a geospatial position.

The method may comprise varying a dormant time before generating the control signal in dependence on a historic actuation rate for a current position of the access control device.

According to a further aspect of the present invention there is provided a non-transitory computer-readable medium having a set of instructions stored therein which, when executed, cause a processor to perform the method(s) described herein.

Unless indicated to the contrary, either implicitly, explicitly or by virtue of the context, the term "position" is used herein to refer to a geospatial position.

The terms "actuate", "actuation" and derivatives thereof are used herein to indicate that the access control device is in active use. The actuation of the access control device may, for example, comprise a user operating a control interface on the access control device. The user may, for example, press a lock/unlock button provided on the access control device. Alternatively, or in addition, the actuation of the access control device may comprise detection that the access control device is being handled or manipulated by the user, for example when the access control device is picked up from rest, shaken or moved. The movement of the access control device may, for example, be in a predetermined pattern relative to the vehicle as part of an unlock gesture. Any such gestures may be detected by one or more sensor, such as an accelerometer or gyroscope, disposed in the access control device. The access control device may also include automated operation, for example when communicating with a base station associated with the access control device. The automated operation of the access control device may, for example, comprise receiving a challenge signal from the base station and transmitting an authentication signal in response to the challenge signal.

Any control unit or controller described herein may suitably comprise a computational device having one or more electronic processors. The system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or control unit, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. The control unit or controller may be implemented in software run on one or more processors. One or more other control unit or controller may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIG. 2 shows a schematic representation of an access control device forming part of the vehicle access system shown in FIG. 1;

FIGS. 4A, 4B and 4C show graphs illustrating operation of the access control device inside and outside of the designated area illustrated in FIG. 3.

DETAILED DESCRIPTION

Figure 1:
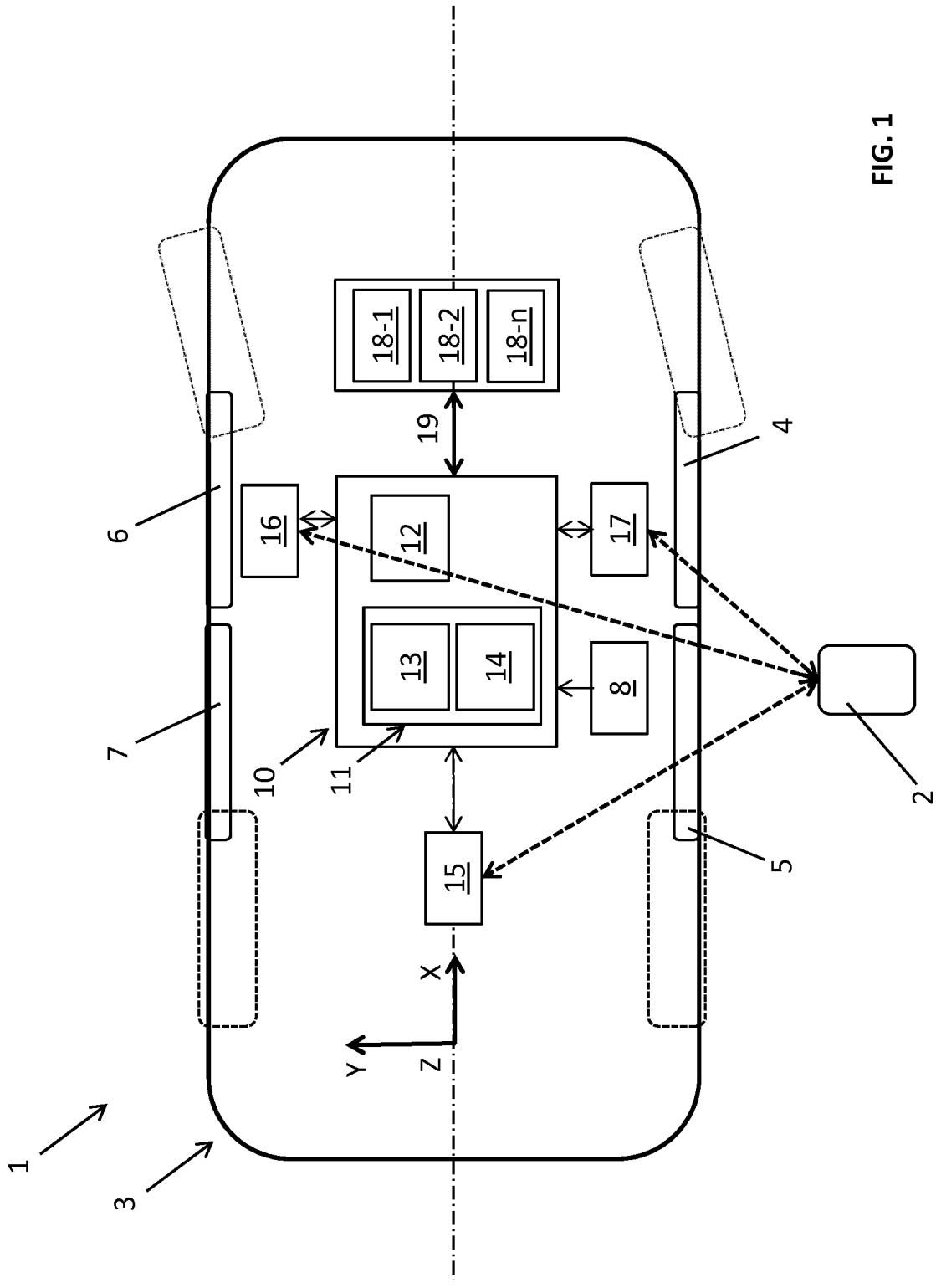
FIG. 1 shows a schematic representation of a vehicle incorporating a vehicle access system in accordance with an embodiment of the present invention.

A vehicle access system 1 comprising an access control device 2 in accordance with an embodiment of the present invention will now be described. As shown in FIG. 1, the vehicle access system 1 is configured to provide remote control of one or more functions of a vehicle 3. Exemplary functions that may be controlled include, but are not limited to, enhanced Passive Entry and Passive Start (ePEPS) keyless access, remote engine start, remote opening and closing of vehicle apertures, deployment and retraction of external mirrors, a tow-bar or antennas, remote raising or lowering of side windows, remote opening or closing of a sunroof, remote opening or closing of a tailgate, remote activation of a vehicle powertrain, remote activation of a vehicle heating ventilation and air conditioning (HVAC) system, and/or activation and deactivation of lighting and signalling systems of the vehicle 3.

The vehicle 3 in the present embodiment is an automobile, but the vehicle access system 1 may be implemented in other types of vehicle. The vehicle 3 has a front right door 4, a rear right door 5, a front left door 6 and a rear left door 7. The vehicle 3 also has a boot lid (also known as a deck lid or trunk lid) which can be locked/unlocked by the vehicle access system 1 but this is not described herein. The front and rear doors 4 to 7 each comprise a locking mechanism. The locking mechanisms each comprise a lock actuator operable to lock and unlock a mechanical lock. The front doors 4, 6 each have a folding door mirror incorporating a mirror actuator for folding and unfolding the door mirrors. The vehicle 3 optionally comprises a positioning system 8, such as a Global Navigation Satellite System (GNSS), for example, Global Positioning System (GPS), to receive a position signal SLOC indicating a current (i.e. real time) geospatial position of the vehicle 3. Other techniques may be used to determine the geospatial position of the vehicle 3, for example by wireless communication with one or more nodes of a cellular communication network (either directly from a wireless transceiver disposed in the vehicle 3, or via a cellular telephone paired to the vehicle 3).

The vehicle access system 1 comprises a base station 10 which is operatively installed in the vehicle 3 to provide a Remote Function Actuator (RFA). The base station 10 comprises a first electronic control unit 11 and a first rechargeable battery 12. The first electronic control unit 11 comprises a first memory storage device 13 in communication with a first processor 14. The first processor 14 is configured to execute computational instructions stored in the first memory storage device 13. The first rechargeable battery 12 provides a dedicated power supply for the base station 10 to enable its operation independently of a vehicle power system (not shown). The base station 10 comprises first, second and third ultra-wideband transceivers 15, 16, 17. The relative position of the transceivers 15, 16, 17 in the vehicle 3 are defined. In the present embodiment, the first transceiver 15 is located at the rear of the vehicle 3 and the second and third transceivers 16, 17 are located in the upper part of the vehicle 3 (typically in the roof) on the right and left sides respectively of the vehicle 3. The first, second and third transceivers 15, 16, 17 are connected to the first electronic control unit 11 via a communication network, such as a dedicated local interconnect network (LIN). The transceivers 15, 16, 17 each comprise an antenna.

The base station 10 is connected to a plurality of vehicle systems 18-1, 18-2 etc. (referred to collectively herein as 18-n) via a communication network 19, such as a CAN bus. The vehicle systems 18-n may, for example, comprise the door locking mechanisms and/or the folding door mirrors described herein. Alternatively, or in addition, the vehicle systems 18-n may include one or more of the following: closure systems for vehicle apertures, such as a door windows, a sun roof, a deck lid, a bonnet (hood); a ventilation system; engine start/ignition; a vehicle lighting (internal and/or external); entertainment systems; horn; heater; air conditioning; a deployable tow-bar; security systems, such as an alarm system and/or a vehicle immobiliser; etc. The base station 10 is operable to receive a status signal from each vehicle system 18-n (for example, to indicate a current state of the door locking mechanisms; and/or to indicate a current position of the folding door mirrors); and to output a control signals to each vehicle system 18-n to control operation thereof (for example to operate the lock actuators to lock or unlock the door locking mechanisms; and/or to operate the mirror actuators to fold or unfold the folding door mirrors). The communication network 19 can also be employed to convey instructions from the first electronic control unit 11 to other systems (e.g., actuators, system controllers and control units) of the vehicle 3, such as a powertrain control unit, to facilitate enabling and/or disabling of one or more vehicle systems (e.g., passive engine starting).

The access control device 2 is a portable device, typically in the form of a handheld device. The access control device 2 in the present embodiment is in the form of a key fob, but could be incorporated into a cellular telephone or a portable computational device. As described herein, the access control device 2 communicates with the base station 10 to control the vehicle systems 18-n, for example to unlock the door mechanisms to provide passive entry to the vehicle 3. As shown schematically in FIG. 2, the access control device 2 comprises a second electronic control unit 20, a remote ultra-wideband transceiver 21 and a second battery 22. The second electronic control unit 20 comprises a second memory storage device 23 in communication with a second processor 24. The second battery 22 provides a dedicated power supply for the access control device 2. The second battery 22 in the present embodiment is a rechargeable battery which may, for example, be charged when the access control device 2 is connected to the base station 10. As described herein, the second electronic control unit 20 is configured to control operation of the access control device 2. The second processor 24 is configured to execute computational instructions stored in the second memory storage device 23. The second processor 24 may optionally be configured to implement a clock function to determine a time of day. The access control device 2 also comprises a movement sensor 30, such as an accelerometer, for detecting movement of the access control device 2.

The first, second and third transceivers 15, 16, 17 provided on the vehicle 3 are operable to communicate with the access control device 2. The distance from each of the first, second and third transceivers 15, 16, 17 to the remote transceiver 21 can be determined by measuring transmission and/or response times (for example, time of flight for a signal transmission). Since the relative positions of the first, second and third transceivers 15, 16, 17 on the vehicle 3 are known, the position of the access control device 2 in relation to the vehicle 3 can be determined through triangulation. The use of ultra-wideband frequencies (typically greater than 3 GHz) allows the position of the access control device 2 to be tracked with a relatively high degree of accuracy. The determination of the position of the access control device 2 relative to the vehicle 3 can be performed by the first electronic control unit 11 provided in the base station 10; and/or the second electronic control unit 20 provided in the access control device 2. In the present embodiment, the second electronic control unit 20 is configured to determine the position of the access control device 2 relative to the vehicle 3. A geospatial position of the vehicle 3 may be known, for example from the positioning system 8. The second electronic control unit 20 may use the known geospatial position of the vehicle 3 to estimate the geospatial position of the access control device 2. In a variant, the access control device 2 may comprise a positioning system operable to determine the geospatial position of the access control device 2.

The second electronic control unit 20 is selectively operable in a first operating mode P1 and a second operating mode P2. The first operating mode P1 may be a limited response mode in which the access control device consumes less power. The limited response mode may, for example, be one of the following: a "sleep" mode (i.e. completely inactive for a period of time); a limited response duty cycle mode (inactive for a long period of time), or periodically active for a short period of time. The first operating mode P1 is a low-power mode in the present embodiment. The second electronic control unit 20 may disable or suppress selected control functions or features when operating in the first operating mode P1. For example, the second electronic control unit 20 may reduce or inhibit communication with the base station 10 when operating in the first operating mode P1. As described herein, the access control device 2 is configured to activate the first operating mode P1 to conserve power in the second battery 22. The second operating mode P2 may be activated when movement of the access control device 2 is detected, and/or the access control device 2 is actuated. The actuation of the access control device 2 comprises operating the access control device 2. The actuation of the access control device 2 may, for example, comprise a user pressing a button on the access control device 2 (such as a LOCK/UNLOCK button) and/or moving the access control device 2 to perform a gesture. The operation of the second electronic control unit 20 to control switching between said first and second operating modes P1 and P2 will now be described.

Figure 3:
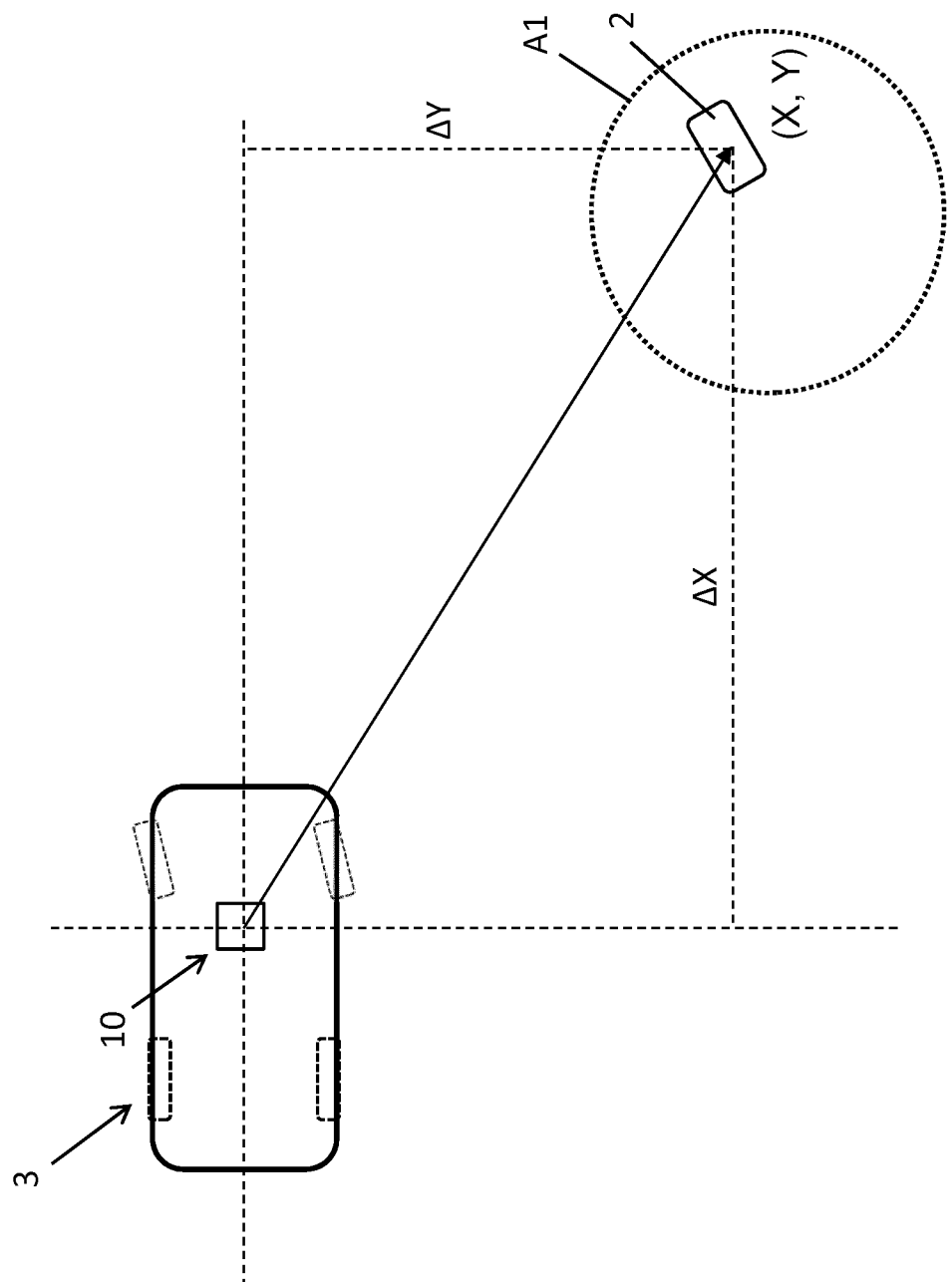
FIG. 3 shows a schematic representation of a designated area in which switching power modes of the access control device is expedited.

The applicant has recognised that a user may habitually leave the access control device 2 in the same position when it is not in use. For example, upon returning home from work in the evening, a user may leave the access control device 2 on the same shelf or in the same drawer. The second electronic control unit 20 is configured to identify when the access control device 2 is located in a position where expected usage of the access control device 2 is low. The expected usage of the access control device 2 may, for example, be predicted in dependence on historic usage of the access control device 2 in a particular position. As illustrated in FIG. 3, one or more designated area A1 is defined to identify a geospatial position (or geospatial positions) where expected usage of the access control device 2 is low. The designated area A1 may, for example, correspond to a position where the access control device 2 is stored when not in use, for example a position where the access control device 2 is left overnight or for extended periods of time during the day. The designated area A1 may define a specific geospatial position or a geospatial area. It will be understood that the one or more designated area A1 is typically unique for any given access control device 2.

As described herein, the second electronic control unit 20 determines the position of the access control device 2 relative to the vehicle 3. The second electronic control unit 20 is configured to determine when the access control device 2 is positioned within the designated area A1. Upon determining that the access control device 2 is positioned within the designated area A1, the second electronic control unit 20 may be configured to generate a control signal S1 to activate the first operating mode P1. The first operating mode P1 may be activated automatically when the second electronic control unit 20 determines that the access control device 2 is located in the designated area A1. However, this control strategy may result in erroneous activation of the first operating mode P1, for example if the access control device 2 is transported through the designated area A1.

In order to reduce or avoid unnecessary switching between the first and second operating modes P1, P2, the second electronic control unit 20 is configured to activate the first operating mode P1 upon determining that the access control device 2 has been stationary (immobile) for a predetermined period of time. The position of the access control device 2 remains substantially unchanged when it is stationary. The second electronic control unit 20 may determine that the access control device 2 is stationary by communicating with the base station 10 to identify changes in position relative to the vehicle 3. Alternatively, or in addition, the movement sensor 30 may determine when the access control device 2 is stationary. The second electronic control unit 20 is configured to implement a timer module for monitoring a time period that the access control device 2 is stationary. In a further variant, the base station 10 may monitor the position of the access control device 2 to identify when the access control device 2 is stationary.

The second electronic control unit 20 is configured to output the control signal S1 to activate the first operating mode P1 when the access control device 2 is identified as being dormant (or inactive). The second electronic control unit 20 characterises the access control device 2 as being dormant when it is has been stationary for a predetermined period of time (referred to herein as a "dormant time $t_{(DOR)}$"). The dormant time $t_{(DOR)}$ may be controlled dynamically in dependence on the position of the access control device 2. The second electronic control unit 20 may be configured to reduce the dormant time $t_{(DOR)}$ when the access control device is in the designated area A1. When the access control device 2 is positioned inside the designated area A1, the second electronic control unit 20 outputs the control signal S1 when the access control device 2 is stationary for a first dormant time $t_{1(DOR)}$. When the access control device 2 is positioned outside the designated area A1, the second electronic control unit 20 outputs the control signal S1 when the access control device 2 is stationary for a second dormant time $t_{2(DOR)}$. The first dormant time $t_{1(DOR)}$ is less than the second dormant time $t_{2(DOR)}$, such that the first operating mode P1 is activated more quickly when the access control device 2 is positioned inside the designated area A1. The dormant time $t_{(DOR)}$ may be proportional to a historic usage of the access control device 2 in a given position. The implementation of a dormant time $t_{(DOR)}$ which is determined dynamically in dependence on the position of the access control device 2 may be used independently of, or in conjunction with, the designated area A1.

The access control device 2 may be configured to communicate with the positioning system 8 to download any stored positions or addresses into the second memory storage device 23. The access control device 2 may use a stored position or address to identify a designated area A1 where the access control device 2 is likely to be dormant for an extended period of time. By way of example, the user may set a home position and/or a work position using the positioning system 8 in the vehicle 3. The home position and/or the work position are used to identify designated areas where the access control device 2 is likely to be dormant for an extended period of time. The vehicle access system 1 may be arranged to communicate with the positioning system 8, and upon determining that the vehicle has arrived at a stored position or address, such as the predefined home position and/or the work position, send a signal to the access control device 2 to provide a notification that the access control device 2 is likely to be dormant for an extended period of time following locking of the vehicle 3. At least in certain embodiments, this arrangement provides the benefit of reducing power consumption and also reducing storage requirements in the second memory storage device 23.

In a variant, the base station 10 may monitor the position of the access control device 2 and identify when the access control device 2 has been stationary (immobile) for a predetermined time period inside the designated area A1. In this iteration, upon determining that the access control device 2 has been stationary for the predetermined time period inside the designated area A1, the base station 10 may transmit a notification signal to the access control device 2 to activate the first operating mode P1.

In a further variant, the second electronic control unit 20 is configured to characterise the access control device 2 as being dormant when it is not actuated by a user for the predetermined dormant time $t_{(DOR)}$. When determining whether the access control device 2 is dormant, the second electronic control unit 20 may optionally also monitor movement to identify when the access control device is stationary (i.e. immobile). For example, the second electronic control unit 20 may identify the access control device 2 as being dormant when it has not been actuated and has remained stationary for the predetermined dormant time. The dormant time $t_{(DOR)}$ may be controlled dynamically in dependence on the position of the access control device 2. The second electronic control unit 20 is configured to reduce the predetermined dormant time $t_{(DOR)}$ when the access control device 2 is in the designated area A1. When the access control device 2 is positioned outside the designated area A1, the second electronic control unit 20 outputs the control signal S1 when the access control device 2 is stationary for the first dormant time $t_{1(DOR)}$. When the access control device 2 is positioned inside the designated area A1, the second electronic control unit 20 outputs the control signal S1 when the access control device 2 is stationary for a second dormant time $t_{2(DOR)}$. The second dormant time $t_{2(DOR)}$ is less than the first dormant time $t_{1(DOR)}$, such that the first operating mode P1 is activated more quickly when the access control device 2 is located in the designated area A1. The second dormant time $t_{2(DOR)}$ may, for example, be one (1) or two (2) seconds. The first dormant time $t_{1(DOR)}$ is significantly longer and may be as long as one (1) or more minutes. The dormant time $t_{(DOR)}$ may be proportional to a historic usage of the access control device 2 in a given position.

The designated area A1 could be user defined. For example, the user may specify one or more "home" position for the access control device 2 which can be defined as the designated area A1. In the present embodiment, the second electronic control unit 20 is configured automatically to identify one or more designated area A1. The second electronic control unit 20 is configured to monitor actuation of the access control device 2 to determine an actuation rate of the access control device at a given position. The second electronic control unit 20 can identify one or more position where the actuation rate of the access control device 2 is below a predefined actuation threshold. The actuation threshold may, for example, correspond to actuation of the access control device 2 less than one (1) time for every ten (10) hours. The second electronic control unit 20 may be configured to identify any position where the actuation rate is below the predefined actuation threshold on a plurality of separate occasions, for example to identify a position where the actuation rate is below the predefined actuation threshold on at least five (5) or ten (10) separate occasions. The second electronic control unit 20 may define any such positions as being a designated area A1. The second electronic control unit 20 can optionally be configured to identify a position where the access control device 2 remains stationary for a period of time longer than a predetermined time threshold. The time threshold may, for example, be defined as four (4) or eight (8) hours. Other values for time thresholds are useful and may be selected from a number of different thresholds, each associated with one or more of the following: a time of day, a day of the week and/or a position. The designated area A1 may be identified as a position where the access control device 2 remains at least substantially stationary for a period of time greater than the time threshold. In a variant the first electronic control unit 11 may monitor the usage and/or the position of the access control device 2 to identify the designated area A1. In such a variant, the base station 10 could be configured to transmit a notification signal to the access control device 2 to indicate when the access control device 2 is positioned within a designated area A1. Alternatively, the base station 10 may be configured to transmit the control signal S1 to activate the first operating mode P1.

The operation of the vehicle access system 1 is illustrated in FIGS. 4A, 4B and 4C. The access control device 2 is initially in the second operating mode P2. The acceleration of the access control device 2 (as measured by the movement sensor 30) is illustrated in FIG. 4A. In the time period t0 to t1, the access control device 2 is being carried by a user and the resulting movements are detected by the movement sensor 30. At time t1, the access control device 2 is stationary, for example the access control device 2 is placed on a table. The second electronic control unit 20 detects the uniform acceleration and identifies that the access control device 2 is stationary. A timer is started to measure the dormant time $t_{1(DOR)}$. The activation of the first operating mode P1 is dependent on the determined position of the access control device 2. As shown in FIG. 4B, if the access control device 2 is identified as being inside the designated area A1, the second processor 24 is configured to output the control signal S1 to activate the first operating mode P1 upon determining that the access control device 2 has remained stationary for a second dormant time $t_{2(DOR)}$. As shown in FIG. 4C, if the access control device 2 is identified as being outside the designated area A1, the second processor 24 is configured to output the control signal S1 to activate the first operating mode P1 upon determining that the access control device 2 has remained stationary for a first dormant time $t_{1(DOR)}$. The second dormant time $t_{2(DOR)}$ is less than the first dormant time $t_{1(DOR)}$, as represented by the symbol Δt in FIG. 4B. Thus, the activation of the first operating mode P1 occurs more quickly when the access control device 2 is located in the designated area A1. In this way, energy may be conserved by the access control device 2 and the useful life of the energy storage means, such as the second battery 22, is increased.

The designated area A1 may be defined as a positional offset relative to a predefined position. The positional offset may be a result of inherent inaccuracies in determining the position of the access control device 2. Alternatively, the positional offset may be defined relative to a known position of the access control device 2. For example, the designated area A1 may be defined as ±x metre(s) relative to the predefined position, where x is greater than or equal to one (1) metre, two (2) metres or five (5) metres. Other values of x may usefully be defined to define different positional offsets.

It will be appreciated that various modifications may be made to the embodiment(s) described herein without departing from the scope of the appended claims.

The second electronic control unit 20 may be configured to identify the designated area(s) A1 by identifying one or more position where the access control device 2 switches from the second operating mode P2 to the first operating mode P1 on a predetermined number of occasions. For example, if the second electronic control unit 20 determines that the access control device 2 has switched from the second operating mode P2 to the first operating mode P1 at the same position on a plurality of separate occasions, this position may be used to define the designated area A1.

The vehicle access system 1 has been described herein as determining an absolute geospatial position of the access control device 2 in order to control activation of the first operating mode P1. In this arrangement, the designated area A1 is also defined in absolute terms. In a variant, the designated area A1 may merely be defined in relation to the vehicle 3, for example a particular heading and/or distance from the vehicle 3. The determination of the relative position of the access control device 2 relative to the vehicle 3 is illustrated in FIG. 3 by X and Y coordinates. By monitoring the position of the access control device 2 relative to the vehicle 3, the first electronic control unit 11 or the second electronic control unit 20 may determine when the access control device 2 is located in the designated area A1.

In a further development, the first electronic control unit 11 or the second electronic control unit 20 may track a path or movement route of the access control device 2 to identify when expected usage is low. This technique may be applicable if the user follows an identifiable route from the vehicle 3 into their home or place of work where the access control device 2 will be stored. The tracking of the path or movement route may be performed in addition to, or instead of, the techniques described herein to determine when the access control device 2 is located in a designated area A1.

It has been recognised also that there may be a consistency in the time of day when the user is less likely to use the access control device 2. In a further development, the second electronic control unit 20 may be configured to generate the control signal S1 in dependence on a time of day and/or a day of the week.

Figure 5:
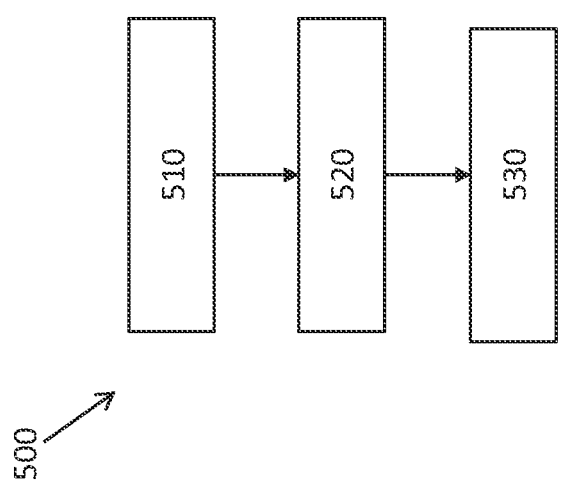
FIG. 5 shows a block diagram illustrating an example method of controlling operation of an access control device.

FIG. 5 shows a block diagram illustrating a method 500 of controlling operation of an access control device. In a first block 510, the method comprises: determining a position of the access control device. In a second block 520, the method comprises: generating a control signal for activating the first operating mode, the control signal being generated in dependence on the determined position of the access control device. In a third block 530, the method comprises: identifying when the access control device is located in a low usage position where expected usage of the access control device is low, the expected usage of the access control device being predicted in dependence on historic usage of the access control device in a particular position. The method 500 can be performed by a controller. The controller can be provided in the access control device 2. Alternatively, the controller may be remote from the access control device. The controller may be provided in the vehicle 3, for example in the base station 10. The controller may be the first electronic control unit 11 or the second electronic control unit 20.

The invention claimed is:

1. A controller for controlling operation of an access control device for a vehicle, the access control device being selectively operable in a first operating mode and a second operating mode, the access control device being in a limited response mode when operating in the first operating mode, the controller comprising a processor and a memory means, the processor being configured to:
   determine a position of the access control device; and
   generate a control signal for activating the first operating mode, the control signal being generated in dependence on the determined position of the access control device; and
   identify when the access control device is located in a low usage position where expected usage of the access control device is low, the expected usage of the access control device being predicted in dependence on historic usage of the access control device in a particular position.

2. A controller as claimed in claim 1, wherein the processor is configured to identify when the access control device is positioned within a designated area; and to generate the control signal for activating the first operating mode in dependence on identification that the access control device is positioned within the designated area.

3. A controller as claimed in claim 2, wherein the processor is configured to identify the designated area by:

recording a first time when the access control device is substantially stationary and optionally not in communication with the vehicle;

recording a second time when the access control device is actuated;

determining a time period elapsed between said first and second times; and identifying the designated area as the position of the access control device between said first and second times when the time period is greater than a predefined time period.

4. A controller as claimed in claim 2, wherein the processor is configured to identify one or more position of the access control device when the access control device is actuated; and optionally also determining an actuation rate of the access control device at a given position; the processor being configured optionally to identify the designated area by identifying one or more position where the actuation rate of the access control device is less than a predefined actuation threshold.

5. A controller as claimed in claim 2, wherein the processor is configured to generate the control signal in dependence on determination that the access control device has been dormant for a predetermined period of time.

6. A controller as claimed in claim 5, wherein, when the access control device is positioned inside the designated area, the predetermined period of time is a first dormant time; and, when the access control device is positioned outside the designated area, the predetermined period of time is a second dormant time; the second dormant time being longer than the first dormant time.

7. A controller as claimed in claim 2, wherein the processor is configured to identify the designated area by identifying a position where the access control device switches from the second operating mode to the first operating mode on a predetermined number of occasions.

8. A controller as claimed in claim 1, wherein the processor is configured to vary a dormant time before generating the control signal in dependence on a historic actuation rate of the access control device at a current position.

9. An access control device comprising the controller as claimed in claim 1.

10. An access control system comprising the access control device as claimed in claim 9.

11. A method of controlling operation of an access control device which is selectively operable in a first operating mode and a second operating mode, the access control device being in a limited response mode when operating in the first operating mode, the method comprising:

determining a position of the access control device; and generating a control signal for activating the first operating mode, the control signal being generated in dependence on the determined position of the access control device; and identifying when the access control device is located in a low usage position where expected usage of the access control device is low, the expected usage of the access control device being predicted in dependence on historic usage of the access control device in a particular position.

12. A method as claimed in claim 11, comprising:

identifying when the access control device is positioned within a designated area; and activating the first operating mode upon identification that the access control device is positioned within the designated area.

13. A method as claimed in claim 12, comprising identifying the designated area by:

recording a first time when the access control device is substantially stationary and optionally not in communication with the vehicle;

recording a second time when the access control device is actuated;

determining a time period elapsed between said first and second times; and identifying the designated area as the position of the access control device between said first and second times when the time period is greater than a predefined time period.

14. A method as claimed in claim 12, comprising identifying one or more position of the access control device when the access control device is actuated; and determining an actuation rate of the access control device at a given position.

15. A method as claimed in claim 14, comprising identifying the designated area by identifying an area where the actuation rate of the access control device is less than a predefined actuation threshold.

16. A method as claimed in claim 12, comprising activating the first operating mode in dependence on determination that the access control device has been dormant for a predetermined period of time.

17. A method as claimed in claim 16, wherein, when the access control device is positioned inside the designated area, the predetermined period of time is a first dormant time; and, when the access control device is positioned outside the designated area, the predetermined period of time is a second dormant time; the second dormant time being longer than the first dormant time.

18. A method as claimed in claim 12, comprising identifying the designated area by identifying a position where the access control device switches from the second operating mode to the first operating mode on a predetermined number of occasions.

19. A method as claimed in claim 11, comprising varying a dormant time before generating the control signal in dependence on a historic actuation rate for a current position of the access control device.

20. A non-transitory computer-readable medium having a set of instructions stored therein which, when executed, cause a processor to perform the method claimed in claim 11.

* * * * *